United States Patent
Pedersen

(10) Patent No.: US 8,677,743 B2
(45) Date of Patent: Mar. 25, 2014

(54) WAVE ENERGY EXTRACTION AND ACCUMULATION SYSTEM

(76) Inventor: Steven Pedersen, Baltimore, MD (US)

( * ) Notice: Subject to any disclaimer, the term of this patent is extended or adjusted under 35 U.S.C. 154(b) by 378 days.

(21) Appl. No.: 13/156,774

(22) Filed: Jun. 9, 2011

(65) Prior Publication Data

US 2012/0186244 A1     Jul. 26, 2012

Related U.S. Application Data

(60) Provisional application No. 61/397,430, filed on Jun. 14, 2010.

(51) Int. Cl.
*F03C 1/00* (2006.01)
*F03B 13/10* (2006.01)

(52) U.S. Cl.
USPC .............. 60/497; 60/505; 290/42; 290/53

(58) Field of Classification Search
USPC .............. 60/398, 497–507; 290/42, 53; 417/330–337
See application file for complete search history.

(56) References Cited

U.S. PATENT DOCUMENTS

| | | | |
|---|---|---|---|
| 2008/0197631 A1* | 8/2008 | Atilano Medina et al. | 290/42 |
| 2008/0260548 A1* | 10/2008 | Ahdoot | 417/333 |
| 2009/0235660 A1* | 9/2009 | Oigarden | 60/501 |

* cited by examiner

*Primary Examiner* — Hoang Nguyen

(57) ABSTRACT

Invention for extraction and accumulation of energy from displacement of an agitated fluid includes buoyant body, camshaft, flywheel, and platforms. Buoyant body floats upon agitated fluid surface and is constrained to vertical translation. Buoyant body translation is converted to flywheel rotation via bearings which engage helical cam tracks of a camshaft. Camshaft is torsionally engaged with flywheel. Buoyant body and camshaft are fitted with unidirectional rotary clutches. Upon action of rising wave, buoyant force is exerted upon buoyant body, displacing body vertically and causing bearings to apply torsion to camshaft, driving camshaft and flywheel into rotation. Upon wave recession, buoyant body descends under self weight via freewheeling action of unidirectional clutches. Flywheel may be filled with or emptied of fluid to adjust its rotary inertia during operation. Buoyant body has a tapered shape and may be filled with or emptied of fluid to adjust its interface with agitated fluid.

15 Claims, 6 Drawing Sheets

SECTION A-A

SECTION A-A

DETAIL C

DETAIL A

DETAIL B

WAVE ENERGY EXTRACTION AND ACCUMULATION SYSTEM

FIELD OF THE INVENTION

This Invention relates to mechanical systems which extract and accumulate energy from surface wave displacement of an agitated fluid.

REFERENCES CITED

U.S. Pat. No. 3,965,365 PARR
U.S. Pat. No. 4,277,690 NOREN
U.S. Pat. No. 4,228,360 NAVARRO
U.S. Pat. No. 4,379,235 TREPL
U.S. Pat. No. 5,424,582 TREPL
U.S. Pat. No. 7,525,214 ATILANO MEDINA
U.S. Pat. No. 7,687,931 GASENDO
WO/2007/125538 KUMAR

RELATED APPLICATION

Provisional Application 61/397,430 filed Jun. 14, 2010.

BACKGROUND OF THE INVENTION

Numerous prior inventions utilize the displacement of an agitated fluid such as ocean waves to extract and accumulate useful energy. Certain of these inventions utilize buoyant bodies and flywheels in concert with rotary clutches, ratchet wheels or similar unidirectional torque transmission means.

Prior art refinements have addressed two problems: 1) the problem of converting wave displacement input into continuous rotary output; and 2) the problem of extracting maximum useful energy from variable wave input.

As to problem (1),

Kumar WO/2007/125538 uses a connecting rod and crankshaft to link buoyant body and generator.

Atilano Medina U.S. Pat. No. 7,525,214 uses multiple rack/pinion mechanisms with freewheel means to extract energy from both the rising and falling phases of buoyant body.

Gasendo U.S. Pat. No. 7,687,931 uses a rack/pinion, ratchet and speed increasing transmission to link buoyant body and flywheel.

Trepl U.S. Pat. No. 5,424,582 uses cables, sheaves and counterweights on a drive shaft to extract energy from both the rising and falling phases of buoyant body.

Noren U.S. Pat. No. 4,277,690 uses a hydraulic piston and rectifier circuit to drive a hydraulic motor.

As to problem (2),

Atilano Medina U.S. Pat. No. 7,525,214 uses a buoyant body with fin means to pivot body into direction of waves.

Trepl U.S. Pat. No. 5,424,582 uses an inclined-bottom float containing a fixed quantity of ballast, along with an electrical load controller to govern flywheel speed.

Trepl U.S. Pat. No. 4,469,955 uses a buoyant body with fin means to pivot body into direction of waves.

Parr U.S. Pat. No. 3,965,365 uses a plurality of buoyant bodies and a means of spacing the latter to adjust to wavelength of agitated fluid.

This survey of the prior art reveals deficiencies of robustness, simplicity, efficiency, and reliability of such inventions, particularly if deployed in oceanic service.

BRIEF SUMMARY OF THE INVENTION

The present Invention is a wave energy extraction and accumulation system which uses, in common with previous inventions, a buoyant body, flywheel and transmission means, but improves on the prior art by providing a novel and useful means of linear to rotary motion transmission, and novel and useful means of adjustment of the mass properties of both flywheel and buoyant body to obtain maximum energy extraction under a range of wave lengths and amplitudes.

An object of the present Invention is to provide an improved system for the economic extraction and accumulation of useful energy from surface wave displacement of an agitated fluid such as ocean waves.

A second object is to provide a system as described above and possessing an improved means of converting linear motion of a buoyant body to rotary motion of a flywheel.

A third object is to provide a system as described above and possessing a novel and useful means of realtime adjustment of flywheel inertia.

A fourth object is to provide a system as described above and possessing a novel and useful buoyant body geometry and means to enable maximization of work performed on buoyant body by wave action.

A fifth object is to provide a system as described above and possessing an improved design in which the entire transmission means can be readily isolated from environmental contaminants and corrosive agents such as sea water.

DETAILED DESCRIPTION OF THE INVENTION

Figure 1:
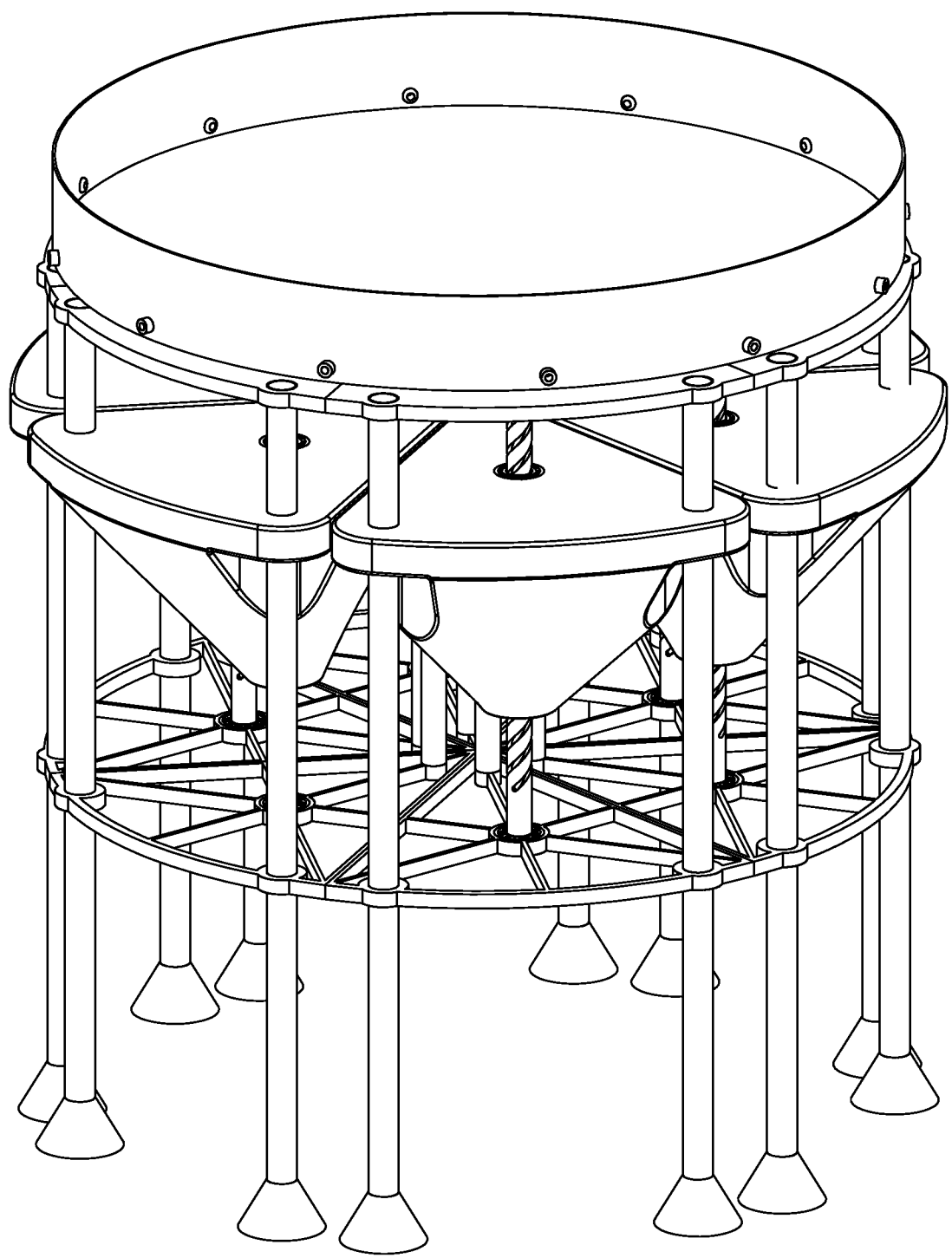
FIG. 1 displays an isometric view of Invention in a preferred embodiment.
Figure 2:
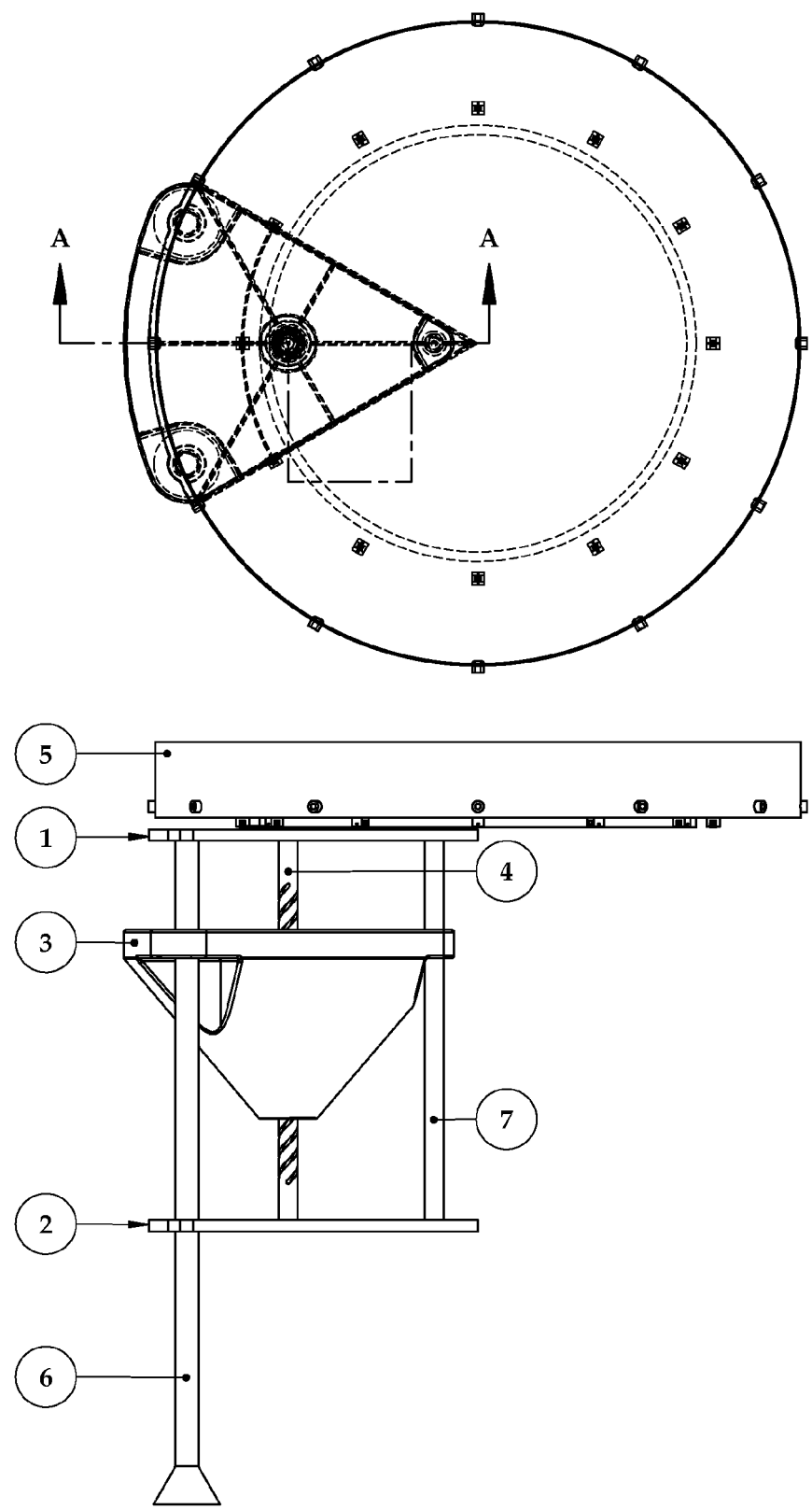
FIG. 2 displays one portion of Invention to illustrate components and define Section A-A.
Figure 3:
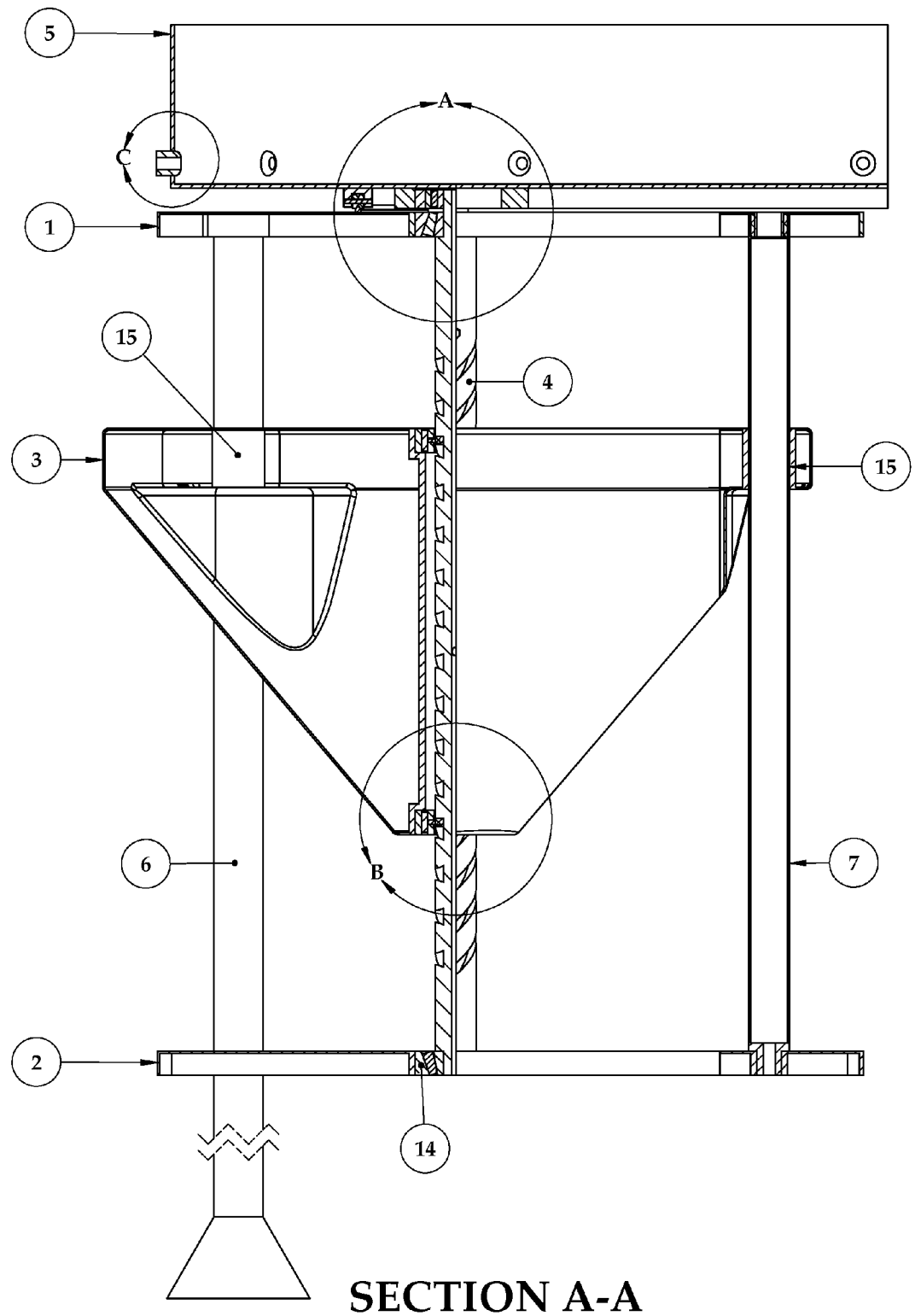
FIG. 3 illustrates Section A-A and defines Detail Views A, B, C.

Referring to FIGS. 1-4, an embodiment of the Invention is constructed as a horizontal upper platform 1 located above a body of agitated fluid having surface waves of sufficient energy as to be economically possible to extract, such as are available in many oceanic locations. A lower platform 2 is positioned beneath upper platform and is submerged under fluid surface. Platforms are mounted upon a plurality of columns 6 which may be anchored to a fixed object such as the ocean floor. Elevations of upper and/or lower platforms may be individually or collectively adjustable. A flywheel 5 in the form of a container capable of being partially or completely filled with fluid is mounted upon platform on a plurality of bearings 12 riding on rail 13, or any equivalent bearing means which constrain flywheel to axial rotation. Flywheel is fitted with a ring gear 10 upon its underside surface. Engaged to ring gear via pinion gear 11 and unidirectional rotary clutch 9 is a camshaft 4 mounted to platform via bearings 14. Camshaft is fitted with a plurality of helical cam tracks 16 upon its exterior surface. A buoyant body 3 is also fitted with one or more unidirectional rotary clutches 9. Inner races of the rotary clutches fitted to buoyant body are also fitted with a plurality of radially oriented bearings 8 each of which engage one cam track of camshaft. Columns 6 and shaft 7 intersect buoyant body. Journal bearings 15 ride upon said columns and shaft and constrain rotation of buoyant body while allowing vertical displacement. Platform elevation and associated structural dimensions are such that buoyant body is in brought into contact with agitated fluid surface and provided with unimpeded vertical translation under all expected conditions of sea level and wave amplitude.

In a first phase of operation, a rising surface wave exerts a buoyant force upon buoyant body 3, urging the latter to upward translation. Buoyant body being in engagement with camshaft 4 via unidirectional rotary clutches 9 fitted with bearings 8, a torque is applied to camshaft, rotary clutches being locked from rotation during this phase. As torque is transmitted to flywheel 5 via camshaft pinion 11 engaged with flywheel ring gear 10, flywheel is set into rotation and energy extraction and storage during this phase is thus achieved.

In a second phase of operation, surface wave retreats, and buoyant body 3 descends under self weight. Since rotary clutches 9 and bearings 8 remain in engagement with camshaft but freewheel as buoyant body descends, latter is thus allowed unconstrained descent under self weight while maintaining contact with agitated fluid surface.

Figure 4:
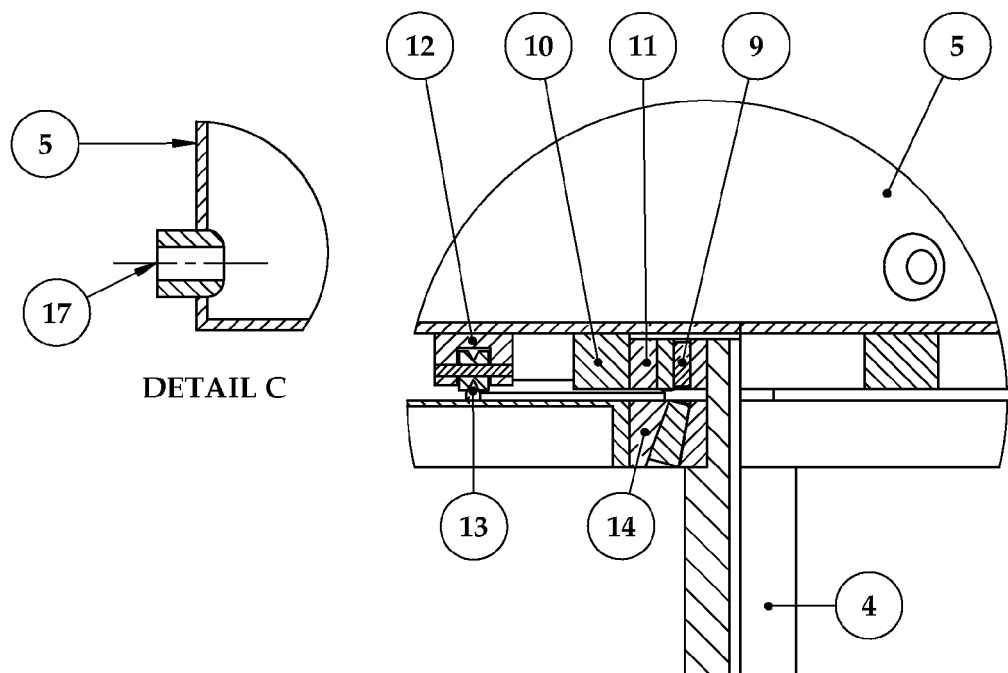
FIG. 4 illustrates Detail Views A, B, C.
Figure 4:
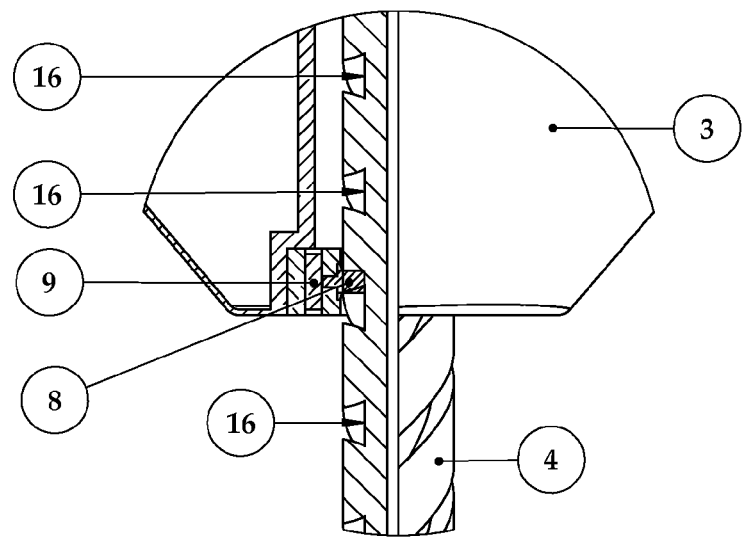
Figure 5:
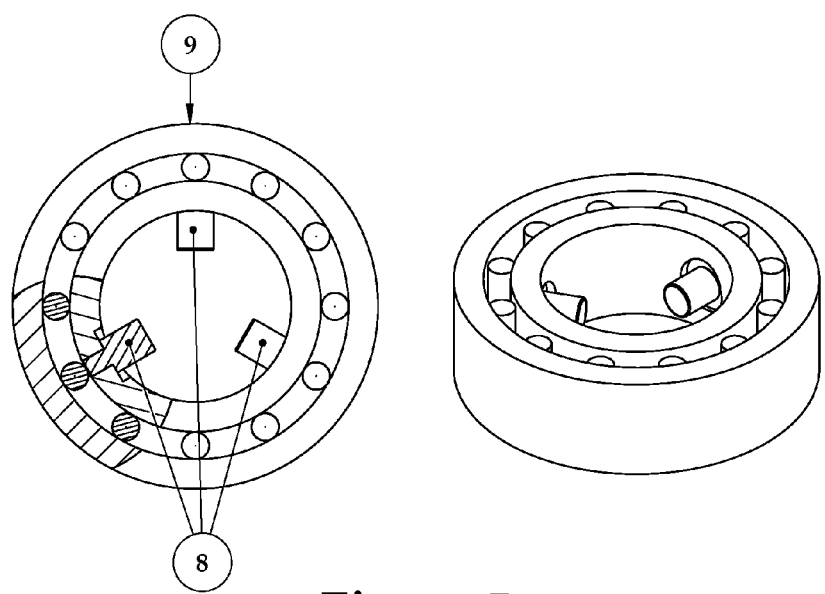
FIG. 5 illustrates a unidirectional rotary clutch equipped with radially oriented bearings.
Figure 6:
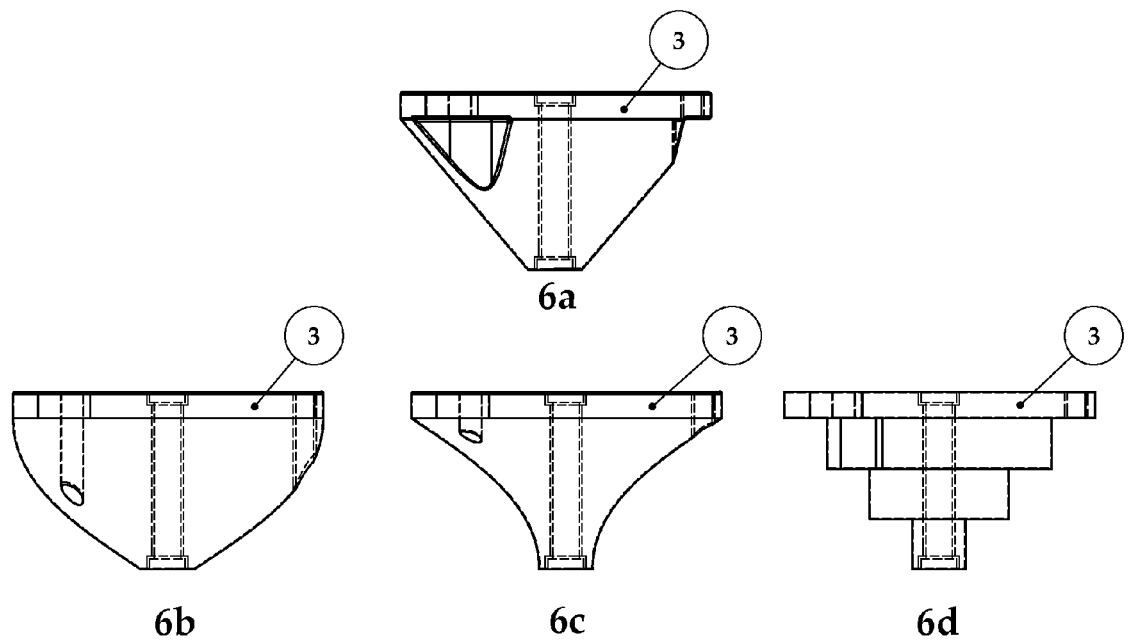
FIGS. 6a-6d illustrate buoyant bodies exhibiting various geometries.

Referring to Details A and B of FIG. 4, unidirectional rotary clutch 9 is shown in use at both the camshaft/flywheel interface, and at the camshaft/buoyant body interface. A second and mechanically equivalent variant of the above may be obtained by not using rotary clutch in buoyant body 3 and instead attaching bearings 8 rigidly to buoyant body in an identical location and orientation, while continuing to employ rotary clutch at the camshaft as shown in Detail A. In this second variant, camshaft is constrained to rotate upon any displacement of buoyant body, while flywheel rotation may overrun camshaft rotation. Action of buoyant body remains as described above.

Referring to Details A and B of FIG. 4, a third and mechanically equivalent variant of the above may be obtained by not using unidirectional rotary clutch 9 at the camshaft/flywheel interface and instead providing a bidirectional torsional engagement means, while maintaining the mechanism at the camshaft/buoyant body interface as shown in Detail B. Action of buoyant body 3 remains as described above.

Rotary inertia of the flywheel of this Invention may be adjusted during operation. As flywheel 5 is in the form of a container capable of being filled with or emptied of fluid, any available fluid may be introduced by, for example, a pump or by rainwater accumulation, thus increasing its rotary inertia by multiples of its dry weight. To reduce rotary inertia during operation, flywheel is fitted with a plurality of valves 17 which enable fluid removal upon centrifugal, manual or automatic command. Valves 17 may be supplemented or replaced by a pump or any equivalent means which enable fluid removal upon manual or automatic command. With these means, a flywheel rotary speed optimized for maximum energy extraction may thus be obtained for any set of wave dynamics. These means enable an additional improvement to the prior art, as under a system startup scenario the flywheel of this Invention may be drained of fluid to obtain a low inertia condition to minimize startup stresses and hasten spin up transition to steady state operation.

Referring to FIGS. 6a-6d, for any set of wave dynamics, a portion of buoyant body 3 is in contact with the agitated fluid. The resulting interface between agitated fluid and buoyant body describes an area having a characteristic interfacial length which is a function of both the geometry and draft of the buoyant body. To obtain maximum work performed on buoyant body by wave action, it is desirable for this length to be maintained at ½ of the predominant wavelength of the agitated fluid. This interfacial length may be adjusted during operation of this Invention by providing a buoyant body which is capable, via pump or equivalent means, of being filled with or emptied of fluid, and also provided with a stepped, conical or otherwise tapered surface, said taper oriented along the main axis of the body, and with said tapered surface in contact with fluid surface. Fluid may be conveyed in or out of buoyant body upon manual or automatic command, thus adjusting buoyant body weight. As said weight is adjusted, buoyant body draft is concurrently adjusted which, due to said tapered geometry, also increases or decreases the interfacial length between buoyant body and fluid surface. This novel and useful combination of tapered geometry and weight adjustment may be used to maintain an interfacial length equal to ½ of the predominant wavelength of the agitated fluid for any set of wave dynamics, thus maximizing the work performed on buoyant body by wave action. Referring again to FIGS. 6a-6d, the ratio of taper to main axis may be constant or variable, increasing or decreasing per any continuous formula, or the taper may be applied as a series of discrete steps of constant or variable increment.

Figure 7:
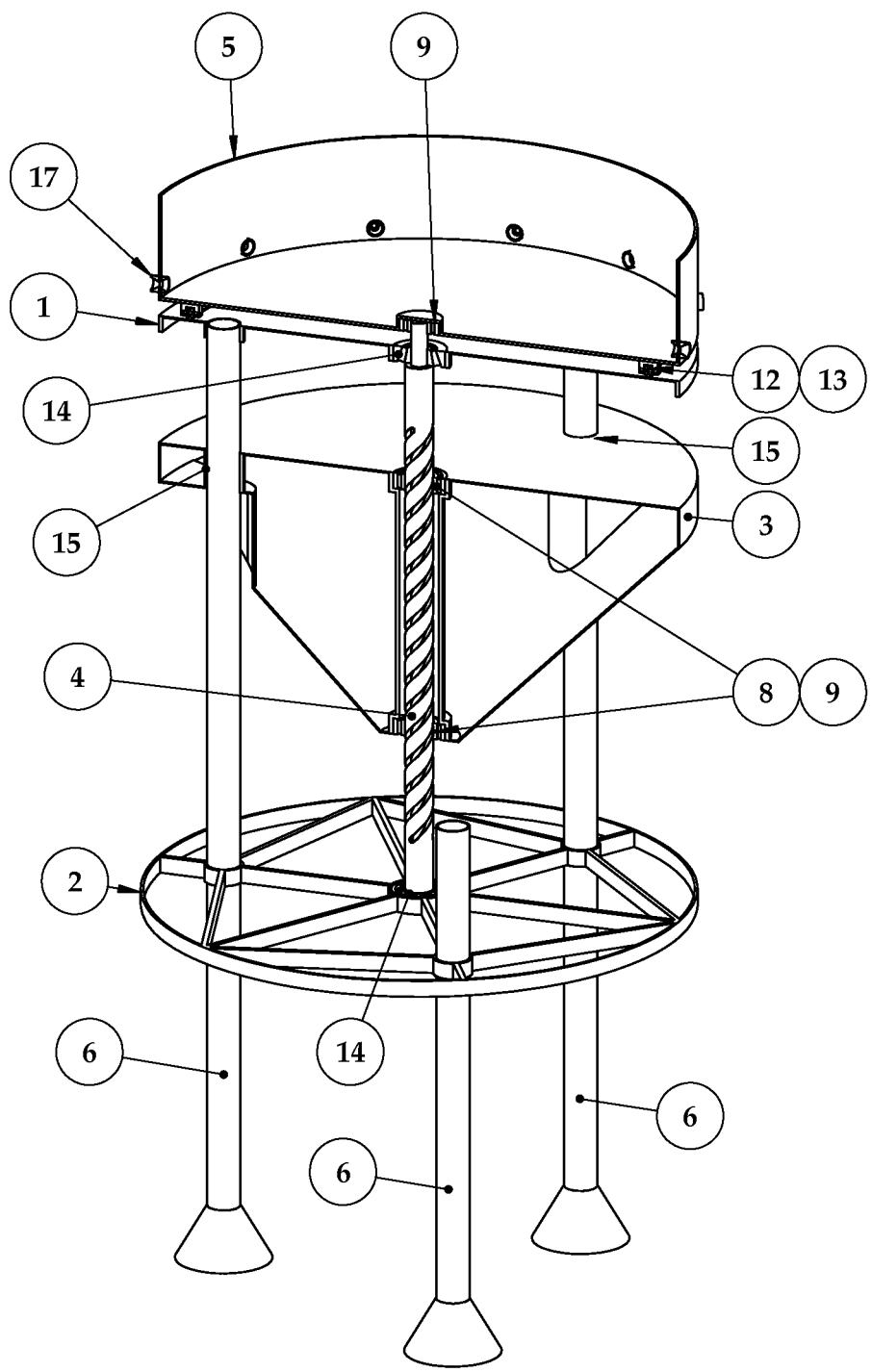
FIG. 7 displays an isometric section view of the Invention in an alternate embodiment.

Per FIG. 1, a preferred embodiment of the Invention is as a circular array of several sets of buoyant bodies and camshafts, each camshaft in torsional engagement with a central flywheel, and the latter receiving and accumulating energy impulses from all members of the array. However, as shown in FIG. 7, this Invention may also be embodied as a system consisting of a single buoyant body and camshaft, with camshaft in torsional engagement with flywheel.

In consideration of the challenging operational conditions to be encountered by any wave energy extraction system if deployed in an oceanic environment, the use, in this Invention, of the described mechanisms enables an additional improvement over the prior art, in that all of the bearing and power transmission means of this Invention are arrayed around columnar members upon which may be readily installed telescoping or corrugated boots. Such protective means may serve to isolate all of the bearing and power transmission components from corrosive agents such as sea water, further facilitating the utility, robustness and reliability potential of this Invention over the prior art.

I claim:

1. A system for extraction and accumulation of energy from surface wave displacement of an agitated fluid comprising:
   a) a first platform positioned above, and a second platform positioned below the surface of said agitated fluid;
   b) a flywheel mounted upon said first platform;
   c) one or more buoyant bodies in contact with said agitated fluid;
   d) one or more reaction shafts in engagement with bearings fitted upon or within each of said buoyant bodies, which constrain rotation of buoyant bodies while allowing vertical displacement of buoyant bodies; and
   e) one or more camshafts, each having a plurality of helical cam tracks.

2. The system as set forth above in claim 1, in which said flywheel is in the form of a container capable of containing fluid and provided with means for filling with and emptying of fluid.

3. The system as set forth above in claim 1, in which said buoyant bodies are in the form of a container capable of containing fluid and provided with means for filling with and emptying of fluid.

4. The system as set forth above in claim 1, in which said buoyant bodies have a conical, stepped or otherwise continuously or incrementally tapered surface, said taper oriented along the vertical axis of the body, and with said tapered surface in contact with fluid surface.

5. The system as set forth above in claim 1, in which a plurality of said buoyant bodies, said camshafts, and said reaction shafts are arrayed around said flywheel, each camshaft being in torsional engagement with flywheel.

6. The system as set forth above in claim 1, which exhibits a single instance of said buoyant body, camshaft, and reaction shaft, camshaft being in torsional engagement with said flywheel.

7. The system as set forth above in claim 1, in which one or more unidirectional rotary clutches are mounted
   a) upon or within said buoyant bodies, each said clutch fitted with a plurality of radially oriented bearings, each of said bearings being in engagement with a cam track of said camshaft, and
   b) upon each of said camshafts, and provide unidirectional torsional engagement between camshaft and said flywheel.

8. The system as set forth above in claim 7, in which said unidirectional rotary clutches are not used, and said radially oriented bearings are instead rigidly attached to said buoyant body.

9. The system as set forth above in claim 7, in which the said unidirectional rotary clutches are not used, and engagement between each of said camshafts and said flywheel is obtained by any means providing bidirectional torsional engagement.

10. The system as set forth above in claim 7, in which the effective vertical distance between said agitated fluid surface and said first and second platforms is individually or collectively adjustable.

11. The system as set forth above in claim 7, in which the effective vertical distance between said agitated fluid surface and said first and second platforms is not adjustable.

12. The system as set forth above in claim 8, in which the effective vertical distance between said agitated fluid surface and said first and second platforms is individually or collectively adjustable.

13. The system as set forth above in claim 8, in which the effective vertical distance between said agitated fluid surface and said first and second platforms is not adjustable.

14. The system as set forth above in claim 9, in which the effective vertical distance between said agitated fluid surface and said first and second platforms is individually or collectively adjustable.

15. The system as set forth above in claim 9, in which the effective vertical distance between said agitated fluid surface and said first and second platforms is not adjustable.

\* \* \* \* \*